US00RE36456E

United States Patent [19]

Kim

[11] E Patent Number: Re. 36,456

[45] Reissued Date of Patent: Dec. 21, 1999

[54] VIDEO SIGNAL CONVERSION METHOD FOR DISPLAYING A 4:3 VIDEO SIGNAL ON A 16:9 SCREEN

[75] Inventor: Jeong-Hoon Kim, Kwacheon, Rep. of Korea

[73] Assignee: Samsung Electronics Co., Ltd., Kyungki-do, Rep. of Korea

[21] Appl. No.: 08/888,015

[22] Filed: Jul. 3, 1997

Related U.S. Patent Documents

Reissue of:

[64] Patent No.: 5,506,625
Issued: Apr. 9, 1996
Appl. No.: 08/393,396
Filed: Feb. 23, 1995

[30] Foreign Application Priority Data

Feb. 23, 1994 [KR] Rep. of Korea ..... 94-3256

[51] Int. Cl.[6] ..... H04N 7/01

[52] U.S. Cl. ..... 348/445; 348/913

[58] Field of Search ..... 348/445, 441, 348/555, 556, 588, 913, 565; H04N 7/01, 5/46

[56] References Cited

U.S. PATENT DOCUMENTS 5,243,421 9/1993 Nagata et al. ..... 348/445
5,323,235 6/1994 Tonomura et al. ..... 348/445
5,347,313 9/1994 Choi ..... 348/445
5,386,236 1/1995 Hong ..... 348/445

OTHER PUBLICATIONS

R. W. Hamming, *Digital Filters*, Englewood Cliffs, NJ: Prentice–Hall, Inc., 1977, pp. 95–98, 218–219.

*Primary Examiner*—Michael Lee
*Attorney, Agent, or Firm*—Sughrue, Mion, Zinn, Macpeak & Seas, PLLC

[57] ABSTRACT

The present invention provides a video signal conversion method for displaying a video signal having a 4:3 aspect ratio on a screen having a 16:9 aspect ratio by using a single clock. The video signal conversion comprises the steps of inserting two zero pixels between two pixels of the 4:3 video signal, [band] *low* pass filtering the two pixels of the 4:3 video signal, such that [¾ of the bandwidth of the pixels is passed and upper and lower parts of pixels are not passed,] *the ¾ band of the upper part and the lower part of the spectrum are respectively passed,* and sampling the filtered pixels by every fourth transition of a clock signal, and then displaying the sampled pixels on the 16:9 screen.

16 Claims, 4 Drawing Sheets

FIG. 1A
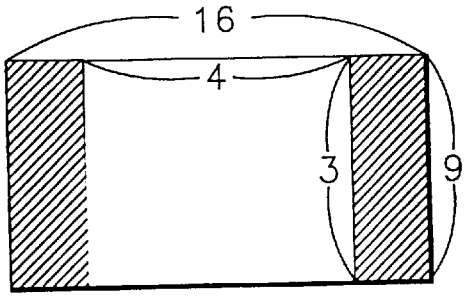
FIG. 1B
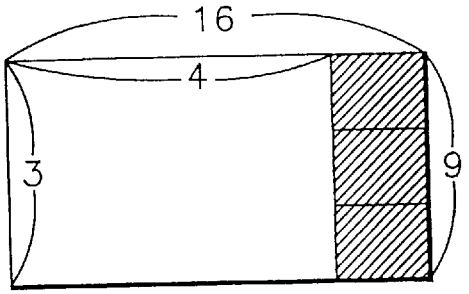
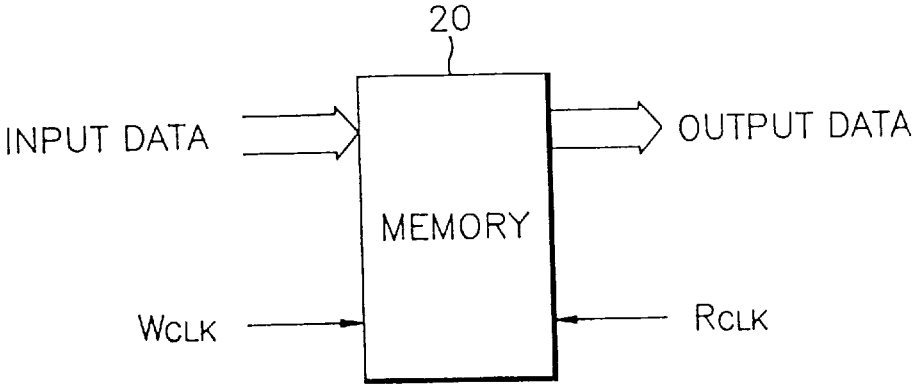
FIG. 2

FIG. 3A
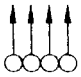
FIG. 3B
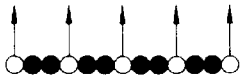
FIG. 3C
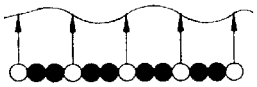
FIG. 3D
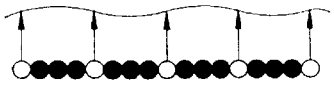
FIG. 3E
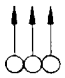
FIG. 3F
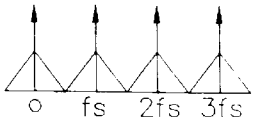
FIG. 3G
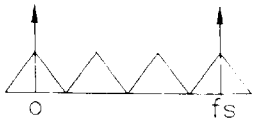
FIG. 3H
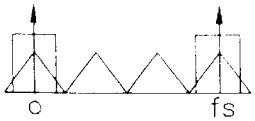
FIG. 3I
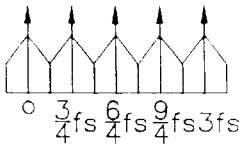
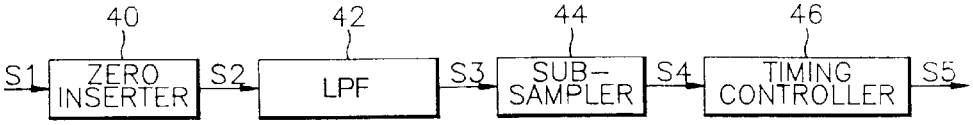
FIG. 4
AMENDED
FIG. 6A 56 59 62 65 68 71
FIG. 6B 56' 59' 62' X 68' 71'
FIG. 6C 56' 59' 62' 68' 71'

50
53
56
59
62
65
68
71
51 52
54 55
57 58
60 61
63 64
66 67
69 70
C−5 C−4 C−2 C−1 C1 C2 C4 C5
C−6
C−3
C0
C3
C6

56
59
62
65
C−6 C−5 C−4 C−3 C−2 C−1 C0 C1 C2 C3 C4 C5 C6

59
62
65
68
C−6 C−5 C−4 C−3 C−2 C−1 C0 C1 C2 C3 C4 C5 C6

56'
59'
62'

VIDEO SIGNAL CONVERSION METHOD FOR DISPLAYING A 4:3 VIDEO SIGNAL ON A 16:9 SCREEN

Matter enclosed in heavy brackets [ ] appears in the original patent but forms no part of this reissue specification; matter printed in italics indicates the additions made by reissue.

BACKGROUND OF THE INVENTION

The present invention relates to a video signal conversion method and more particularly to the video signal conversion method for displaying a video signal having an aspect ratio of 4:3 on a screen having an aspect ratio of 16:9.

The screen aspect ratio that gives one the feeling of being at a live performance is 16:9. However, the aspect ratio of most screens used in general-purpose televisions is 4:3. A television having a screen aspect ratio of 16:9, for example, a wide screen television, has been used, thus giving the viewer a feeling of being at a live performance.

FIG. 1 shows a video signal having an aspect ratio of 4:3 (hereinafter referred to as a "4:3 video signal") displayed on a screen having an aspect ratio of 16:9 (hereinafter referred to as a "16:9 screen") so that the viewer can feel as if present at a live performance. FIG. 1A shows the 4:3 video signal displayed at the center of the 16:9 screen (hereinafter referred to as a "center mode"), and FIG. 1B shows the 4:3 video signal displayed on the left side of the 16:9 screen (hereinafter referred to as a "pop mode"). Displaying the 4:3 video signal on the 16:9 screen without any processing causes the original 4:3 video signal to be displayed with dispersion and out of focus (i.e., with dissimilation). In order to display the 4:3 video signal on the 16:9 screen without such dissimilation occurring, some methods have been suggested and used. One such method is to decimate the original 4:3 video signal by a factor of ¾ (i.e., ¾ decimation).

FIG. 2 is a diagram for describing a conventional video signal conversion method for ¾ decimating the original 4:3 video signal and displaying the decimated signal on the 16:9 screen.

An input data signal is synchronized with a write clock $W_{CLK}$ and stored in a memory 20. The data stored in memory 20 is synchronized with a read clock $R_{CLK}$ and then output. Read clock $R_{CLK}$ has a frequency ⅔ that of write clock $W_{CLK}$. Since the data being output is generated by ¾ decimating the original 4:3 signal, it can be displayed on the 16:9 screen without dissimilation occurring.

However, in the case of converting the 4:3 video signal, as described above, since read clock $R_{CLK}$ and write clock $W_{CLK}$ have different frequencies, separate phase locked loops for read clock $R_{CLK}$ and write clock $W_{CLK}$ are respectively required. In addition, if read clock $R_{CLK}$ and write clock $W_{CLK}$ having different frequencies, are used, high frequency interference noise occurs between read clock $R_{CLK}$ and write clock $W_{CLK}$, between read clock $R_{CLK}$ and the video signal, or between write clock $W_{CLK}$ and the video signal.

SUMMARY OF THE INVENTION

It is therefore an object of the present invention to provide a video signal conversion method and apparatus for displaying a 4:3 video signal on a 16:9 screen by using only a single clock.

It is another object of the present invention to provide the video signal conversion method for displaying the 4:3 video signal on the 16:9 screen without high frequency interference noise occurring.

To achieve the above objects, the video signal conversion method of the present invention comprises the steps of inserting two zero pixels between respective pixels of a 4:3 video signal, [band] *low* pass filtering a [¾ B bandwidth of the respective pixels, between which two zero pixels have been inserted, such that a ¾ B bandwidth is passed and upper and lower frequencies of the respective pixels are not passed,] *¾ band of the upper part and the lower part of the spectrum is respectively passed,* and sampling the filtered pixels by every fourth clock, thereby displaying the sampled pixels on the 16:9 screen.

BRIEF DESCRIPTION OF THE DRAWINGS

In the detailed description of the preferred embodiments of the present invention set forth below, reference is made to the accompanying drawings, in which:

FIG. 1A shows the 4:3 video signal displayed in a center mode on the 16:9 screen;

FIG. 1B shows the 4:3 video signal displayed in a pop mode on the 16:9 screen;

FIG. 2 is a diagram for describing a conventional conversion method of the 4:3 video signal;

FIGS. 3A–3I are diagrams for describing a conversion method of the 4:3 video signal according to the present invention;

FIG. 4 is a block diagram showing the construction of an apparatus for converting the 4:3 video signal according to the present invention;

FIGS. 6A–6C show pixels to be input to and output from the apparatus shown in FIG. 4 for converting the 4:3 video signal according to the present invention.

DETAILED DESCRIPTION OF THE PREFERRED EMBODIMENT

Figures 5A, 5B, 5C, 5D, 5E:
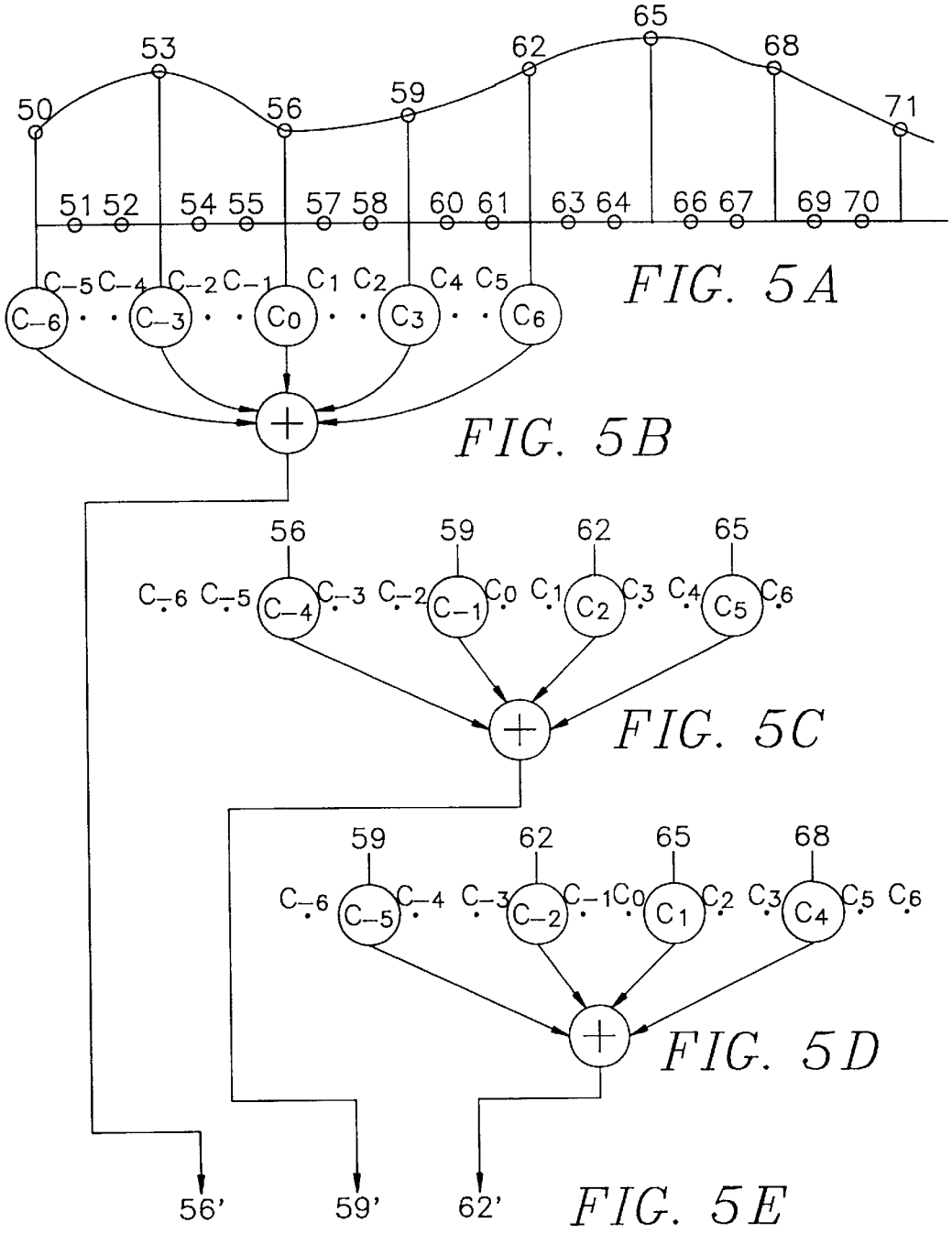
FIGS. 5A–5E show processing of pixels with a [band] *low* pass filter and a sub-sampler.

For clarification of the present invention, the following description is limited to 4 pixels of the 4:3 video signal.

FIG. 3 is a diagram for describing a conversion method of the 4:3 video signal according to the present invention and shows four pixels contained within the original 4:3 video signal which are converted into three pixels. FIGS. 3F–3I show the frequency spectrum corresponding to the conversion of the pixels.

FIG. 3A shows four pixels contained within the original 4:3 video signal, with FIG. 3F showing the spectrum corresponding to the four pixels of FIG. 3A. At this time, the respective sampling frequencies for the pixels are 0, fs, 2 fs, and 3 fs, with each pixel having a bandwidth of 2 B.

FIG. 3B shows the same two pixels of the original 4:3 video signal between which two zero pixels (shown as black pixels) are inserted, whereby the original group of 4 pixels of the original 4:3 video signal, becomes a group of 12 pixels. At this time, the insertion of zero pixels does not necessarily mean that a pixel having a value of zero is inserted, but rather the sampling frequencies of the original pixels is changed. For example, insertion of two zero pixels is accomplished by multiplying the sampling frequency of the respective pixels of the 4:3 video signal by a factor of ⅓. Therefore, it is possible to achieve the same effect as actually inserting zero pixels between the pixels of the video signals. FIG. 3G shows the frequency spectrum corresponding to the original first and second pixels of the video signals and two zero pixels inserted therebetween.

FIG. 3C shows respective pixels of the original 4:3 video signal (shown as white pixels) which have been filtered with a [bandpass] *low pass* filter ([BPF] *LPF*) having a bandwidth of ¾ B. [Band] *Low* pass filtering the original pixels [prevents the upper and lower frequency portions of those pixels from being passed.] *causes the ¾ B of the upper part and the lower part of the spectrum to be respectively passed.* FIG. 3H shows the spectrum corresponding to the first and second pixels of the original 4:3 video signal which have been [band] *low* pass filtered.

FIG. 3D shows 12 filtered pixels to be sampled by every four transitions of a clock, that is, every four pixels. FIG. 3I shows the spectrum corresponding to the sampled pixels as shown in FIG. 3D.

Referring to FIGS. 3F and 3I, the sampling frequencies of four pixels of the original 4:3 video signal are an integral multiple of fs, such as 0, fs, 2 fs and 3 fs, while the sampling frequencies of the pixels which have been [band] *low* pass filtered and sampled according to the present invention are multiples of ¾ fs, such as ¾ fs, 6/4 fs, 9/4 fs and 3 fs. In FIG. 3E, four pixels of the original 4:3 video signal are consequentially output as three pixels by the zero insertion, [band] *low* pass filtering and sampling of the four pixels of the original 4:3 video signal.

FIG. 4 is a block diagram showing the construction of the apparatus for converting the 4:3 video signal according to the present invention.

The conversion apparatus comprises a zero inserter 40 which inserts two zero pixels between respective pixels of the 4:3 video signal, with the sampling frequency of respective pixels being fs, a [band] *low* pass filter ([BPF] *LPF*) 42 which [respectively filters a ¾ B band of pixels in which the upper and lower parts of the pixels are not passed,] *causes the ¾ B of the upper part and the low part of the spectrum to be respectively passed,* a sub-sampler 44 which samples at every fourth clock transition a series of pixels which have been processed by [BPF] *LPF* 42, and a timing controller 46 which generates a write enable signal WE for writing the pixels sampled and output by sub-sampler 44 and a read enable signal RE for reading and displaying the written pixels on the 16:9 screen in either a center mode or a pop mode.

Zero inserter 40 can be realized with a typical interpolator. In this case, assuming that the previous sampling frequency is fs, the interpolator has a sampling frequency 3 fs, thereby achieving the same effect as inserting two zero pixels between the original pixels.

Also, [BPF] *LPF* 42 can be realized by using a filter having 13 filtering counts (taps). However, [BPF] *LPF* 42 can be realized without limiting the number of taps to 13, as in the present embodiment.

FIG. 5 shows how pixels are processed by [BPF] *LPF* 42 and sub-sampler 44 according to the present invention. In FIGS. 5A and 5B, four pixels 56, 59, 62 and 65 are multiplied by 13 taps of $C_{-6}$~$C_6$, and converted into the three pixels 56', 59' and 62', and then output. At this time, the invention is described with respect to pixel 56 which is multiplied by tap $C_0$.

Zero inserter 40 inserts two zero pixels between two pixels of input video signal S1, and outputs the zero-inserted video signal as signal S2 to [BPF] *LPF* 42. Signal S2 is applied to [BPF] *LPF* 42 as shown in FIG. 5A. In [BPF] *LPF* 42, respective pixels are multiplied by the 13 filter taps as shown in FIGS. 5B, 5C and 5D.

Referring to FIG. 5B, the pixels 50, 51, 52, 53, 54, 55, 56, 57, 58, 59, 60, 61 and 62 are sequentially multiplied by the taps $C_{-6}$, $C_{-5}$, $C_{-4}$, $C_{-3}$, $C_{-2}$, [$C_{31\ 1}$] $C_{-1}$, $C_0$, $C_1$, $C_2$, $C_3$, $C_4$, $C_5$ and $C_6$. Also, the pixels of the original 4:3 video signal are [band] *low* pass filtered [at the ¾ band of the upper and lower parts thereof] *so that the ¾ band of the upper and lower parts of the spectrum are respectively passed* by adding respective pixels which have been multiplied by the taps. However, since being multiplied by the zero-inserted pixels 51, 52, 54, 55, 57, 58, 60 and 61 is equal to being multiplied by zero, only the pixels of the original video signal are taken into consideration.

Referring to FIG. 5C, pixels 56, 59, 62 and 65 are sequentially multiplied by taps $C_{-4}$, $C_{-1}$, $C_2$ and $C_5$, and the filtered through the addition thereof.

Referring to FIG. 5D, the pixels 59, 62, 65 and 68 are sequentially multiplied by taps $C_{-5}$, $C_{-2}$, $C_1$ and $C_4$, and then filtered through the addition thereof.

As shown in FIGS. 5B, 5C and 5D, if the filtered pixels are sampled by every fourth clock, pixels 56', 59' and 62' are output corresponding to the pixels 56, 59, 62 and 65 of the original 4:3 video signal.

As described above, if respective pixels of the original 4:3 video signal are [band] *low* pass filtered by being multiplied by the taps, and then sampled by every fourth clock, since the accordingly output video signal is made by decimating the original video signal by ¾, four pixels having an aspect ratio of 4:3 are output as three pixels. Considering from the standpoint of time, the signal corresponding to pixel 65 is processed as a blank.

FIG. 6 shows, from the standpoint of time, the signals S1, S2, S3, S4 and S5 which are input and output from/to [BPF] *LPF* 42, sub-sampler 44 and timing controller 46, referring to the result of FIG. 5.

Referring to FIG. 6A, the pixels 56, 59, 62, 65, 68 and 71 of the original 4:3 video signal S1 are passed through [BPF] *LPF* 42 and sub-sampler 44 and then output as signal S4, as shown in FIG. 6B. The signal S4 is a series of the pixels 56', 59', 62', 68' and 71' and the pixel between pixels 62' and 68' is processed as a blank. The blank-processed pixel of signal S4 is not write-enabled by timing controller 46. As a result, there is a time difference by as much as the blank-processed signal between signal S5, shown in FIG. 6C, and input signal S1. In the case of being displayed on the 16:9 screen, it can be displayed in the center mode or in the pop mode without dissimilation occurring.

FIG. 7 shows the write enable signal WE and read enable signal RE generated by timing controller 46 according to the present invention.

Figure 7A:
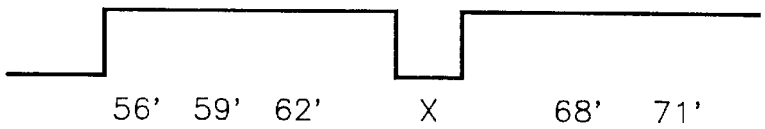
FIGS. 7A–7D show a control signal output from a timing controller according to the present invention.

Timing controller 46 controls the pixels which have been processed at [BPF] *LPF* 42 and sub-sampler 44 by using a memory (not shown) in order to display those pixels on the screen in the center mode or pop mode as shown in FIGS. 1A and 1B. FIG. 7A shows the write enable signal WE which prevents the blank-processed pixel, as shown in FIG. 6, from being stored in the memory. Timing controller 46 maintains the write enable signal WE at a "high" level in order to enable the writing of pixels 56', 59', 62', 68' and 71' of signal S4, and has a "low" level in order not to enable writing of the blank-processed pixel of signal S4. Accordingly, pixels 56', 59', 62', 68' and 71' are sequentially stored in the memory.

Figure 7B:
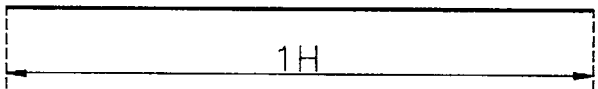
Figure 7C:
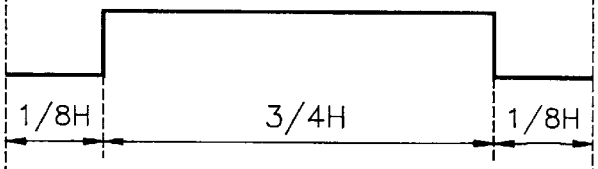
Figure 7D:
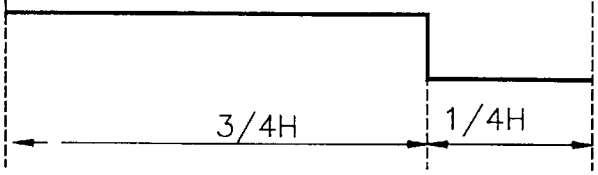

Assuming that the period of the horizontal synchronizing signal is 1H, as shown in FIG. 7B, in the case of displaying signal S5 output from timing controller 46 on the 16:9 screen, in order to display the signal on the screen in the center mode as shown in FIG. 1A, the timing controller 46 must generate the read enable signal RE having a "high" level during a period ¾H in length, corresponding to the middle of the screen as shown in FIG. 7C, and the read enable signal RE having a "low" level during a period ¼H in length corresponding to the right and left sides of the screen. In order to display the signal on the screen in the pop mode as shown in FIG. 1B, the timing controller 46 must generate the read enable signal RE having a "high" level during the ¾H period corresponding to the left side of the screen as shown in FIG. 7D and the read enable signal RE having a "low" level during the ¼H period corresponding to the right side of the screen. Thereby, the pixels of the decimated 4:3 video signal are displayed on the 16:9 screen without dissimilation occurring.

As described above, the original 4:3 video signal is ¾ decimated by inserting two zero pixels between respective pixels of the video signal having an aspect ratio of 4:3, [band] *low* pass filtering the pixels and then sampling those filtered pixels by every fourth clock. At this time, with the use of a single clock, the plurality of phase-locked loops to be applied to the video signal processing apparatus can be simplified to a single phase-locked loop, and the high frequency interference noise generated between the different clocks can be removed.

What is claimed is:

1. A video signal conversion method for displaying a 4:3 video signal having an aspect ratio of 4:3, on a 16:9 screen having an aspect ratio of 16:9, said method comprising the steps of:

inserting zero pixels between a first and second pixel of the 4:3 video signal;

[band] *low* pass filtering said first and second pixel;

sampling the filtered pixels every fourth transition of a clock signal; and displaying the sampled pixels on the 16:9 screen.

2. The video signal conversion method as claimed in claim 1, wherein said [band] *low* pass filtering step [passes a bandwidth such that an upper portion and a lower portion of the frequency spectrum of each pixel is not passed] *causes a ¾ band of an upper part and a lower part of the frequency spectrum of each of said first and second pixels to be passed*.

3. The video signal conversion method as claimed in claim 2, wherein said [band] *low* pass filtering step passes a bandwidth ¾ B, wherein one pixel of 4:3 video signal has a bandwidth of 2 B.

4. The video signal conversion method as claimed in claim 1, wherein two zero pixels are inserted.

5. The video signal conversion method as claimed in claim 4, wherein the insertion of two zero pixels is accomplished by multiplying the sampling frequency of the pixels of said 4:3 video signal by ⅓.

6. The video signal conversion method as claimed in claim 1, wherein said [band] *low* pass filtering is accomplished by multiplying the pixels between which the zero pixels are inserted, by 13 filter taps of a filter.

7. The video signal conversion method as claimed in claim 1, wherein the pixels sampled by every fourth transition of the clock are displayed on a center of the 16:9 screen.

8. The video signal conversion method as claimed in claim 1, wherein the pixels sampled by every fourth transition of a clock are displayed on a side of the 16:9 screen.

9. A video signal conversion apparatus for displaying a 4:3 video signal having an aspect ratio of 4:3, on a 16:9 screen having an aspect ratio of 16:9, said apparatus comprising:

a zero inserter for inserting zero pixels between a first and second pixel of the 4:3 video signal;

a [band] *low* pass filter for [band] *low* pass filtering the first and second pixel having zero pixels inserted therebetween;

a single clock signal;

a sub-sampler for sampling the filtered pixels by every fourth transition of the clock signal; and a controller for displaying the sampled pixels on the 16:9 screen.

10. The video signal conversion apparatus as claimed in claim 9, wherein said [band] *low* pass filter [passes a bandwidth such that an upper portion and a lower portion of the frequency spectrum of each pixel is not passed] *causes a ¾ band of an upper part and a lower part of the frequency spectrum of each of said first and second pixels to be passed*.

11. The video signal conversion apparatus as claimed in claim 10, wherein said [band] *low* pass filter passes a bandwidth ¾ B, wherein one pixel of 4:3 video signal has a bandwidth of 2 B.

12. The video signal conversion apparatus as claimed in claim 9, wherein the zero pixel inserter inserts two zero pixels.

13. The video signal conversion apparatus as claimed in claim 12, wherein the zero inserter inserts two zero pixels by multiplying the sampling frequency of the pixels of said 4:3 video signal by ⅓.

14. The video signal conversion apparatus as claimed in claim 9, wherein said [band] *low* pass filter comprises a filter having 13 taps, said [band] *low* pass filter multiplying the pixels between which the zero pixels are inserted, by the 13 filter taps.

15. The video signal conversion apparatus as claimed in claim 9, wherein said controller displays the pixels sampled by every fourth transition of a clock on a center of the 16:9 screen.

16. The video signal conversion apparatus as claimed in claim 9, wherein said timing controller displays the pixels sampled by every fourth transition of a clock on a side of the 16:9 screen.

* * * * *